United States Patent Office 3,183,273
Patented May 11, 1965

3,183,273
TRI-SUBSTITUTED PHENOLS HAVING ALKYL, TERTIARY ALKYL, AND ARALKYL SUBSTITUENTS
Ronald B. Spacht, Kent, Ohio, assignor to The Goodyear Tire & Rubber Company, Akron, Ohio, a corporation of Ohio
No Drawing. Original application Mar. 31, 1955, Ser. No. 498,430, now Patent No. 2,967,853, dated Jan. 10, 1961. Divided and this application July 26, 1960, Ser. No. 45,276
5 Claims. (Cl. 260—619)

This application is a division of copending application Serial No. 498,430, filed March 31, 1955, now U.S. Patent No. 2,967,853, issued January 10, 1961.

This invention relates to the preservation of rubber, and more particularly to the provision and use of a new class of age resistors for rubber.

Rubber is subject to deterioration from many sources such as sunlight, ozone, atmospheric oxygen, presence of heavy metals, etc. Both cured and uncured natural and synthetic elastomers are subject to deterioration. Deterioration in cured stock may likewise vary with the type of stock, the state of cure, the amount of surface exposed and the temperature at which the rubber is being used. An ideal antioxidant would be one which would protect rubber from deterioration regardless of kind, in the cured or uncured state, no matter where used. Since no such antioxidant has been discovered, compromises must be made in the selectoin of an antioxidant for use in rubber.

Certain alkylated phenols have been found to be effective antioxidants. While many of these phenols have displayed antioxidant activity, there is a very great difference between phenols as to their effectiveness as age resistors. The effectiveness of a phenolic antioxidant will vary with the kind of groups present and the location of these groups. Furthermore, the vapor pressure of the phenolic molecule is of particular importance for certain uses, i.e., for high temperature uses and for uses wherein large rubber surfaces are exposed. Again compromises may have to be made. A good antioxidant may be too volatile for general usage while on the other hand a nonvolatile material may be a poor antioxidant. According to the present invention, a class of phenols has been discovered the members of which exhibit unusual and unexpected antioxidant activity and are relatively nonvolatile. They exhibit a high degree of protection for rubber against sunchecking and against atmospheric oxygen. Also, they are derived from cheap raw materials and hence possess an economic advantage over most antioxidants of this general class.

The known phenolic antioxidants are usually quite volatile because they do not contain sufficient heavy alkylation. In the practice of this invention, it has been discovered that phenolic antioxidants can be prepared which exhibit a very high degree of antioxidant activity and which are relatively nonvolatile. These phenolic compositions are hydroxy organic compounds having at least trisubstitution on the benzene rings, the substituents being aralkyl radicals, tertiary alkyl radicals and alkyl radicals. It has been further discovered that outstandingly effective antioxidant activity is exhibited when the ring positions ortho to a hydroxyl group are occupied by aralkyl radicals selected from the group consisting of primary aralkyl radicals and secondary aralkyl radicals and tertiary alkyl radicals having from 4 to 12 carbon atoms. It has been discovered that phenolic compositions with at least one aralkyl radical ortho to the hydroxyl radical display unexpectedly greater antioxidant activity than similar phenolic materials having ortho-substitution containing the same number of carbon atoms arranged differently.

The compounds of this invention can be further defined by the following structural formula

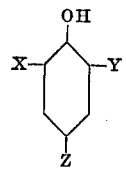

in which X is an aralkyl radical selected from the group consisting of primary aralkyl radicals and secondary aralkyl radicals, Y is a tertiary radical having at least 4 but not over 12 carbon atoms, and Z is an alkyl radical having at least 1 but not over 4 carbon atoms and selected from the group consisting of primary alkyl radicals and secondary alkyl radicals. These compounds are 2,4,6-trisubstituted phenols in which each of the three substituents conforms to a particular type and differs from the other two substituents. For example, paracresol may be reacted with isobutylene and subsequently with styrene to obtain 2-tertiary butyl, 4-methyl, 6-alphaphenylethyl phenol.

The tertiary aliphatic hydrocarbon radicals can have at least 4 but not over 12 carbon atoms. The preferred class is the tertiary alkyl groups containing at least 4 but not over 10 carbon atoms, e.g. tertiary butyl, tertiary amyl, tertiary octyl and tertiary nonyl.

Representaive examples of aralkyl radicals which can be used in the practice of this invention are the alpha-phenylalkyl radicals, such as those derived from styrene and vinyl toluene or benzyl radicals such as those obtained from benzyl halides.

The alkyl radicals can be primary alkyl radicals or secondary alkyl radicals having at least 1 but not over 4 carbon atoms, e.g. methyl, ethyl, propyl, isopropyl or butyl. In the practice of this invention, the starting material may be commercial mixed cresols wherein the primary constituents are paracresol and metacresol and a minor amount of orthocresol, in which instance a primary alkyl radical would be provided by the starting composition. Paracresol is preferred for the reason that many alkylated phenols have not proved to be good antioxidants and this is believd to be due to the fact that the action of the OH group must be substantially inhibited. Therefore, heavy radicals ortho to the hydroxyl group are desirable.

Preferred compositions conforming to this general structural formula are 2-tertiary aliphatic hydrocarbon-4-alkyl hydrocarbon-6-alphaphenylethyl phenol, the preferred compositions being 2-alphaphenylethyl-4-methyl-6-tertiarybutyl phenyl and 2-alphaphenylethyl-4-methyl-6-tertiaryoctyl phenol.

In the practice of this invention, a basic phenolic material, such as a cresol, is reacted with a tertiary olefin and an aralkyl or aralkylene composition. When one of the reactants is diisobutylene, it is preferable that the tertiary composition be reacted first in order to insure a substantial amount of ortho substitution, although this is not a critical requirement.

The total olefin reacted will usually be not less than 1.5 mols nor greater than 3 mols per mol of phenol. The mols of tertiary olefin per mol of phenol may vary from about 0.5 to 1.5 and the mols of aralkyl or aralkylene may vary from about 0.5 to 1.5 per mol of phenol. Preferred ratios are 2 mols of olefin per mol of phenol. Although the conditions of reaction will vary a great deal, depending on the compositions being reacted, the temperature will ordinarily be maintained within a range of 50° C. to 150° C. If the temperature is too high the alkylation catalyst may become a catalyst for de-alkylation.

In the practice of the invention, one or more of the acidic alkylation catalysts is used to activate and accelerate the reactions. For example, sulfuric acid, benzene sulfonic acid, toluene sulfonic acid, activated clays, stannic chloride, ferrous chloride, boron trifluoride, zinc chloride, the ferrous and ferric halides, the stannous and stannic halides and aluminum halide will activate the reactions. Usually, concentrated sulfuric acid is used as the alkylation catalyst. The catalyst will ordinarily be used in an amount of at least 0.5% of the total weight of reactants in order to obtain proper action. Larger amounts of catalyst, for example up to 5.0% by weight of the reactants, are satisfactory.

The preparation of the products of the invention is further illustrated by the following examples:

EXAMPLE 1

Eighty-two grams of tertiary butyl paracresol, 50 milliliters of toluene and .8 gram of sulfuric acid were warmed to 40° C. Fifty-two grams of styrene were added in one hour. The mixture was then stirred for two and one-half hours and allowed to stand over night. The catalyst was then destroyed by the addition of sodium carbonate. Fractional distillation of the reaction product yielded 104.5 grams boiling between 140 and 150° C. at 0.5 millimeter.

EXAMPLE 2

Three hundred twenty-eight grams of tertiary butyl paracresol, 3 grams of fluosulfonic acid and 150 grams of toluene were warmed to 50° C. Two hundred eight grams of styrene were added in two hours keeping the temperature below 65° C. The mixture was then allowed to stand over night after which it was heated for two hours at 70° C. The catalyst was then destroyed and the product was distilled under vacuum. A fraction weighing 418 grams was obtained between 140 and 163° C. at 0.5 millimeter. This set up slowly to a hard crystalline mass which melted at 60 to 64° C. Recrystallization from petroleum ether gave white crystals which melted at 66–67° C.

EXAMPLE 3

Three hundred twenty-eight grams of tertiary butyl paracresol, 3 grams of fluosulfonic acid and 150 grams of toluene were warmed to 40° C. Two hundred eight grams of styrene were added in two hours keeping the temperature below 75° C. The mixture was then heated for an additional two hours at 75° C. The catalyst was then destroyed and the reaction product was cooled. Upon seeding and stirring the entire mass set to a white solid which melted at 47 to 54° C. The yield was quantitative.

EXAMPLE 4

A mixture of 432 grams of paracresol and 5 grams of sulfuric acid was warmed to 80° C. Two hundred twenty-eight and six-tenths grams of isobutylene were then bubbled into the rapidly stirred mixture keeping the temperature below 105° C., the isobutylene being added at the rate of 1 gram per minute. A slight excess of isobutylene was used to allow for mechanical losses. Four hundred sixteen grams of styrene were then added keeping the temperature below 105° C., the styrene being added during two hours. The mixture was stirred for another hour after which 10 grams of anhydrous sodium carbonate were added to destroy the catalyst. The mixture was then allowed to stand and the product was decanted from the solid carbonate. Upon cooling and seeding the reaction product slowly set up to a waxy solid which became completely liquid at 52° C. The yield was 98% (allowing 2% for handling losses).

EXAMPLE 5

A mixture of 216 grams of paracresol and 0.25 gram of sulfuric acid was heated to 150° C. and 104 grams of styrene were then added during half an hour. The reaction mixture was then subjected to vacuum distillation to remove the excess paracresol, a still temperature up to 170° C. and a column temperature of 150° C. at 12 millimeter pressure being needed to completely remove the paracresol. The reaction product weighed 196 grams. One hundred twenty-five grams of unreacted paracresol were recovered. The reaction product of the first step was mixed with 1 gram of sulfuric acid and heated to 100° C. Forty-two grams of isobutylene were then added at the rate of 1 gram per minute after which the mixture was stirred for one hour. Three grams of anhydrous sodium carbonate were then added and the product was then treated as in Example 4. This product crystallized more rapidly than that of Example 4 and was a drier, less waxy material which melted at 47–55° C. The yield was 98% (allowing 2% for handling losses).

EXAMPLE 6

Preparation of 2-benzyl-4-methyl-6-tertiarybutyl phenol was accomplished by dissolving 100 grams of monobenzyl-paracresol in 100 grams of benzene and reacting the same with 47 grams of isobutylene at a temperature of about 40° C. After completion of the reaction, the catalyst was destroyed and the volatiles were removed and the resulting residue recrystallized from petroleum ether yielding 100 grams of white crystals having a melting point of 67–69° C.

EXAMPLE 7

Four hundred thirty-two grams of paracresol and 1 gram of zinc chloride were heated to reflux temperature after which 253 grams of benzyl chloride were added slowly. To this composition, 2.0 grams of sulfuric acid were added to the residue and 88.0 grams of isobutylene were bubbled into the mixture. Thereafter the catalyst was destroyed and the reaction product recrystallized from petroleum ether.

EXAMPLE 8

Paracresol, isobutylene and benzyl chloride were reacted in the ratio of 1:1:1. Two hundred sixteen grams of paracresol were reacted with 113.5 grams of isobutylene in the presence of 2 grams of sulfuric acid at a temperature of about 70 to 90° C. Thereafter, 5 grams of zinc chloride were added to the mixture followed by 253.0 grams of benzyl chloride. The reaction proceeded quietly at a temperature between 115 and 125° C. Thereafter the catalyst was neutralized and the reaction product recrystallized from petroleum ether.

EXAMPLE 9

One hundred twenty-six and five-tenths grams of benzyl chloride were added slowly to 328 grams of tertiarybutyl-paracresol in the presence of 5.0 grams of powdered iron at a temperature of about 120° C. When the reaction was completed, aqueous sodium carbonate was added to remove the ferric chloride which had been formed. Thereafter, excess tertiarybutyl-paracresol was removed by distillation, yielding a final product weighing 212.5 grams.

EXAMPLE 10

In the preparation of 2-alphaphenylethyl-4-methyl-6-tertiarybutyl phenol, 4540 grams of alphaphenylethyl-paracresol dissolved in 2,000 cc. of benzene were reacted with 1258 grams of isobutylene in the presence of 227 grams of sulfuric acid. After the isobutylene had been completely bubbled into the mixture and the reaction was completed, the catalyst was destroyed and the volatile material removed by vacuum distillation leaving 5156.5 grams of product having a melting point between 54 and 62° C.

EXAMPLE 11

The compound of Example 10 was prepared by heating together at about 50° C. 328 grams of tertiarybutyl-paracresol, 150 grams of toluene and 3 grams of fluosulfonic acid catalyst and thereafter slowly adding 208 grams of styrene. After the reaction was completed, the catalyst was neutralized and the volatiles removed by vacuum distillation yielding 533.0 grams of product having a melting point of 47 to 54° C. Recrystallization from petroleum ether yielded a compound having a melting point of 66° C. Analysis of this product gave 85.02% carbon and 9.16% hydrogen which reliably compares with the theoretical 85.07% carbon and 8.95% hydrogen.

EXAMPLE 12

A reaction product was obtained by warming together 216 grams of paracresol and 2 grams of concentrated sulfuric acid catalyst and thereafter rapidly passing 112 grams of isobutylene into the cresol while maintaining the temperature between 120 and 130° C. Thereafter, 208 grams of styrene were added while the temperature was maintained uniform. After completion of the reaction, catalyst was destroyed and the reaction product recrystalized from ether.

EXAMPLE 13

Pure 2-tertiarybutyl-4-alphaphenylethyl-5-methyl phenol was prepared as in Example 13, yielding a product having a melting point of 85 to 86.5° C. and having an analysis of 84.79% carbon and 9.01% hydrogen which favorably compared with the theoretical 85.07% carbon and 8.96% hydrogen.

EXAMPLE 14

A composition comprised essentially of 2-tertiaryoctyl-4-methyl-6-alphaphenylethyl phenol was prepared by heating 110 grams of octyl-paracresol with 1.0 gram of sulfuric acid catalyst and thereafter adding 56 grams of styrene slowly while keeping the temperature below 80° C. After the reaction was completed, the catalyst was destroyed by neutralization, yielding 115.0 grams of product having a boiling point of 190 to 195° C. at 6 millimeters.

EXAMPLE 15

A phenolic antioxidant was made by reacting 216 grams of mixed cresol with 224 grams of diisobutylene in the presence of 12 grams of sulfuric acid catalyst. This mixture was allowed to stand over night and then 208 grams of styrene were added to the mixture. After the reaction was completed, the catalyst was destroyed by neutralization and the reaction product recovered.

The efficacy of this invention has been further demonstrated by testing the antioxidant properties in a standard rubber formulation comprised as follows:

| | |
|---|---|
| Extracted pale crepe | 100.0 |
| ZnO | 5.0 |
| Sulfur | 3.0 |
| Hexamethylene tetramine | 1.0 |
| Stearic acid | 1.5 |
| Antioxidant | 1.0 |

As shown in the following table, antioxidant efficiency is measured by aging samples of rubber containing the antioxidants for 18 days in an oxygen bomb at 50° C. and under 150 pounds per square inch pressure. Tensile retention and weight increase are used as measures of efficiency of the antioxidants.

Table I

[50 Min. Cure at 285° F.]

| | Days in O₂ Bomb | |
|---|---|---|
| | Percent Tensile Retention, 18 Days | Percent Gain in Weight, 18 Days |
| No Antioxidant | 0.0 | 16.4 |
| Antioxidant A¹ | 26.0 | 1.50 |
| 2-alphaphenylethyl-4-methyl-6-tertiary-butyl phenol | 95.8 | 0.21 |
| 2-tertiaryoctyl-4-methyl-6-alphaphenyl-ethyl phenol | 71.4 | 0.34 |
| R.P. m-cresol, p-cresol, diisobutylene and styrene (1:1:1:1) | 80.9 | 0.51 |
| R.P. o-cresol, p-cresol, diisobutylene and styrene | 66.3 | 0.72 |
| R.P. o-cresol, p-cresol, isobutylene and styrene (1:1:1:1) | 60.0 | 0.68 |
| 2-benzyl-4-methyl-6-tertiarybutyl phenol | 107.1 | 0.09 |
| R.P. benzylated-p-cresol and isobutylene | 114.3 | 0.26 |
| R.P. p-cresol, isobutylene and benzyl chloride | 85.0 | 0.38 |
| R.P. tertiary butyl-p-cresol and benzyl chloride | 90.5 | 0.20 |
| R.P. monobenzyl-p-cresol and isobutylene | 97.5 | 0.19 |

¹ A commercial antioxidant comprising a mixture of alkylated phenols.

These results conclusively show that the products of this invention are very effective antioxidants and that the paracresol derivatives are particularly effective.

The products of this invention have been further tested to show that they are effective antioxidants in raw polymers. In the following table, data are shown which illustrates the time required for samples of raw GR-S polymers containing 1.25% antioxidant (based on the weight of rubber solids) to absorb 1% of oxygen in a pure oxygen atmosphere at a temperature of 80° C. The data also show the percent improvement over a commercial antioxidant standard.

Table II

| Antioxidant used | Hrs. required for 1% O₂ Absorption | Percent Improvement |
|---|---|---|
| Antioxidant A¹ | 48 | |
| 2-alphaphenylethyl-4-methyl-6-tertiary-butyl phenol | 124 | 158 |
| 2-tertiarybutyl-4-alphaphenylethyl-5-methyl phenol | 175 | 264 |
| R.P. mixed cresols, isobutylene and styrene | 72 | 50 |

¹ Antioxidant A is a commercial antioxidant comprising a mixture of alkylated phenols.

These data clearly show that the products of this invention are effective antioxidants in raw polymers as well as in cured compounds, and that the para cresol derivatives are particularly useful antioxidants.

Further tests were conducted to establish that the products of the invention are nonstaining and nondiscoloring. Representative products of the invention were compounded in a white rubber formula containing natural rubber, sulfur, zinc, oxide, calcium carbonate, stearic acid, and antioxidant in the relationship of 1 part antioxidant to 100 parts natural rubber. These samples, plus samples containing commercial antioxidants and one sample with no antioxidant, were exposed in a weatherometer for 48 hours. The following table summarizes the results by a comparison color rating.

Table III

Antioxidant used: Rating
    Control—no antioxidant _____ No discoloration.
    Antioxidant A¹ _____ No discoloration.
    2 - alphaphenylethyl,4-methyl,6-t-butyl phenol _____ No discoloration.
    R.P. mixed cresols, isobutylene and styrene (1:1:1) _____ No discoloration.
    2 - benzyl - 4 - methyl-6-t-butyl phenol _____ Slight strain.

¹ A commercial antioxidant comprising a mixture of alkylated phenols.

Although this invention has been described with particular reference to pure phenolic compounds, mixtures of the various phenolic materials are contemplated within the scope of the invention. For example, when commercial mixed cresols are used as the base material, a minor portion of orthocresol is present so that the para position is available for substitution with an aralkyl radical or a tertiarylalkyl radical. Since these products also exhibit antioxidant activity, their separation is not necessary. Also, a small proportion of the mixtures may contain aralkyl and/or tertiarylalkyl substitution in the meta positions. Because these materials also exhibit antioxidant activity, their removal is not essential. In practical commerical operation, the reaction products of phenol or the cresols, the aralkyl compositions and the tertiaryalkyl compositions will be preferred because isolation of the pure materials would add unnecessary cost to production of the products. By exercising care in the practice of the invention, almost all of the products will be the preferred materials.

While certain representative embodiments and details have been shown for the purpose of illustrating the invention, it will be apparent to those skilled in this art that various changes and modifications may be made therein without departing from the spirit or scope of the invention.

I claim:

1. As composition of matter, a tri-substituted phenol having the ortho positions substituted with (*a*) an aralkyl substituent selected from the group consisting of alpha phenyl alkyl radicals and benzyl radicals and (*b*) a tertiary alkyl substituent having at least 4 but not over 12 carbon atoms and the para position substituted with a methyl radical.

2. As a composition of matter a 2-tertiary alkyl-4-methyl-6-alphaphenylalkyl phenol in which the 2-tertiary alkyl radical contains at least 4 but not over 12 carbon atoms.

3. As a composition of matter, 2-alphaphenylethyl, 4-methyl, 6-tertiarybutyl phenol.

4. As a composition of matter, 2-alphaphenylethyl, 4-methyl, 6-tertiaryoctyl phenol.

5. The compound 2-tertiary-butyl-6-benzyl-p-cresol.

References Cited by the Examiner
UNITED STATES PATENTS

| | | | |
|---|---|---|---|
| 2,276,117 | 3/42 | Taylor et al. | 260—619 |
| 2,330,722 | 9/43 | Lieber | 260—619 X |
| 2,537,337 | 1/51 | Fearey | 260—624 X |
| 2,670,340 | 2/54 | Kehe. | |
| 2,714,120 | 7/55 | Kehe | 260—619 |

OTHER REFERENCES

Stillson et al.: Journal of American Chemical Society, 1945, vol. 67, pp. 303–307.

LEON ZITVER, *Primary Examiner.*

CHARLES B. PARKER, *Examiner.*